US007353588B2

(12) United States Patent
Crain et al.

(10) Patent No.: US 7,353,588 B2
(45) Date of Patent: Apr. 8, 2008

(54) INSTALLATION TOOL FOR ASSEMBLING A ROTOR BLADE OF A GAS TURBINE ENGINE FAN ASSEMBLY

(75) Inventors: Harold Keith Crain, Mechanicsburg, IL (US); Gregory Edmond Andruskevitch, Riverton, IL (US); Daniel Eugene Wieprecht, Petersburg, IL (US)

(73) Assignee: General Electric Company, Schenectady, NY (US)

(*) Notice: Subject to any disclaimer, the term of this patent is extended or adjusted under 35 U.S.C. 154(b) by 484 days.

(21) Appl. No.: 10/600,282

(22) Filed: Jun. 20, 2003

(65) Prior Publication Data

US 2004/0258529 A1 Dec. 23, 2004

(51) Int. Cl.
*B23P 19/00* (2006.01)

(52) U.S. Cl. ............................ 29/700; 29/464; 29/468; 29/270

(58) Field of Classification Search .................. 29/464, 29/468, 244, 245, 251, 281.5, 270, 271, 273, 29/700; 269/269, 270; 74/552
See application file for complete search history.

(56) References Cited

U.S. PATENT DOCUMENTS 3,872,565 A * 3/1975 Ritz et al. ..................... 29/723
4,185,372 A 1/1980 Dupree et al.
4,650,436 A * 3/1987 Thro et al. ..................... 445/63
5,680,689 A 10/1997 Holladay
5,737,816 A * 4/1998 Hartmann et al. .......... 29/23.51
5,871,234 A * 2/1999 Umemura et al. .......... 280/777
5,893,202 A 4/1999 Graham et al.
6,249,954 B1 * 6/2001 Kawabe et al. ............... 29/468

* cited by examiner

*Primary Examiner*—David P. Bryant
*Assistant Examiner*—SArang Afzali
(74) *Attorney, Agent, or Firm*—William Scott Andes; Armstrong Teasdale LLP

(57) ABSTRACT

A rotor blade installation tool for coupling a plurality of rotor blades to a rotor disc wherein each rotor blade extends from the rotor disc to a radially outer blade tip is provided. The tool includes a blade engagement end configured to engage the plurality of rotor blades between the rotor disc and the radially outer blade tip where said blade engagement end comprises an engagement top surface, at least one brace coupled to said blade engagement end at a first end of said at least one brace, and a guide end coupled to a second end of said at least one brace where said guide end comprises a body including a guide end top surface positioned above said engagement top surface.

10 Claims, 5 Drawing Sheets

INSTALLATION TOOL FOR ASSEMBLING A ROTOR BLADE OF A GAS TURBINE ENGINE FAN ASSEMBLY

BACKGROUND OF THE INVENTION

This invention relates generally to gas turbine engines, and more specifically to methods and apparatus for assembling gas turbine engine fan assemblies.

At least some known gas turbine engines include a fan for supplying air to a compressor that compresses incoming air which is mixed with a fuel and channeled to a combustor wherein the mixture is ignited within a combustion chamber for generating hot combustion gases. The hot combustion gases are channeled downstream to a turbine, which extracts energy from the combustion gases for powering the fan and compressor, as well as producing useful work to propel an aircraft in flight or to power a load, such as an electrical generator.

Known compressors include a rotor assembly that includes at least one row of circumferentially spaced rotor blades. Each rotor blade includes an airfoil that includes a pressure side and a suction side connected together at leading and trailing edges. Each airfoil extends radially outward from a rotor blade platform. Each rotor blade also includes a dovetail that extends radially inward from the platform, and is used to mount the rotor blade within the rotor assembly to a rotor disk or spool. More specifically, at least some known rotor disks include a plurality of circumferentially-spaced dovetail slots that are each sized to receive a respective one of the plurality of rotor blades therein. Known rotor blade dovetails are generally shaped complementary to the dovetail slot to enable the rotor blade dovetails and the rotor disk slot to mate together and form a dovetail assembly. Adapters may be used to facilitate the mating of the dovetails and the slots.

During an installation process, interlocking mid-span dampers extending between adjacent blades, may overlap rather than interlock, if the blades are not inserted substantially simultaneously into the dovetail slots. Know methods of inserting the blade into the dovetails include incremental insertion of each blade in turn until all blades are seated into the dovetail. If, during the installation process, mid-span dampers overlap, the installation process is stopped and the dampers are disengaged before the installation is resumed. If the mid-span dampers become overlapped such that they cannot be disengaged manually, each mid-span damper may need to be non-destructively tested. Because each rotor includes numerous blades and each blade may be handled numerous times during installation, the installation process may be time-consuming and laborious. Additionally, manufacturer requirements may require engines to be removed from an aircraft, or be at least partially disassembled to accommodate the installation process.

BRIEF DESCRIPTION OF THE INVENTION

In one aspect, a method for assembling a rotor assembly for a gas turbine engine is provided. The method includes providing a plurality of rotor blades that each include a dovetail, providing a rotor disc that includes a plurality of dovetail slots spaced circumferentially about the disc, partially inserting each rotor blade dovetail into a respective rotor dovetail slot, and seating the plurality of rotor blades in the respective rotor dovetail slot substantially simultaneously using an annular blade installation tool.

In another aspect, a rotor blade installation tool for installing a plurality of rotor blades onto a rotor disc is provided. The tool includes a blade engagement end, at least one brace coupled to the blade engagement end at a first end of the at least one brace, and a guide end coupled to a second end of the at least one brace.

DETAILED DESCRIPTION OF THE INVENTION

Figure 1:
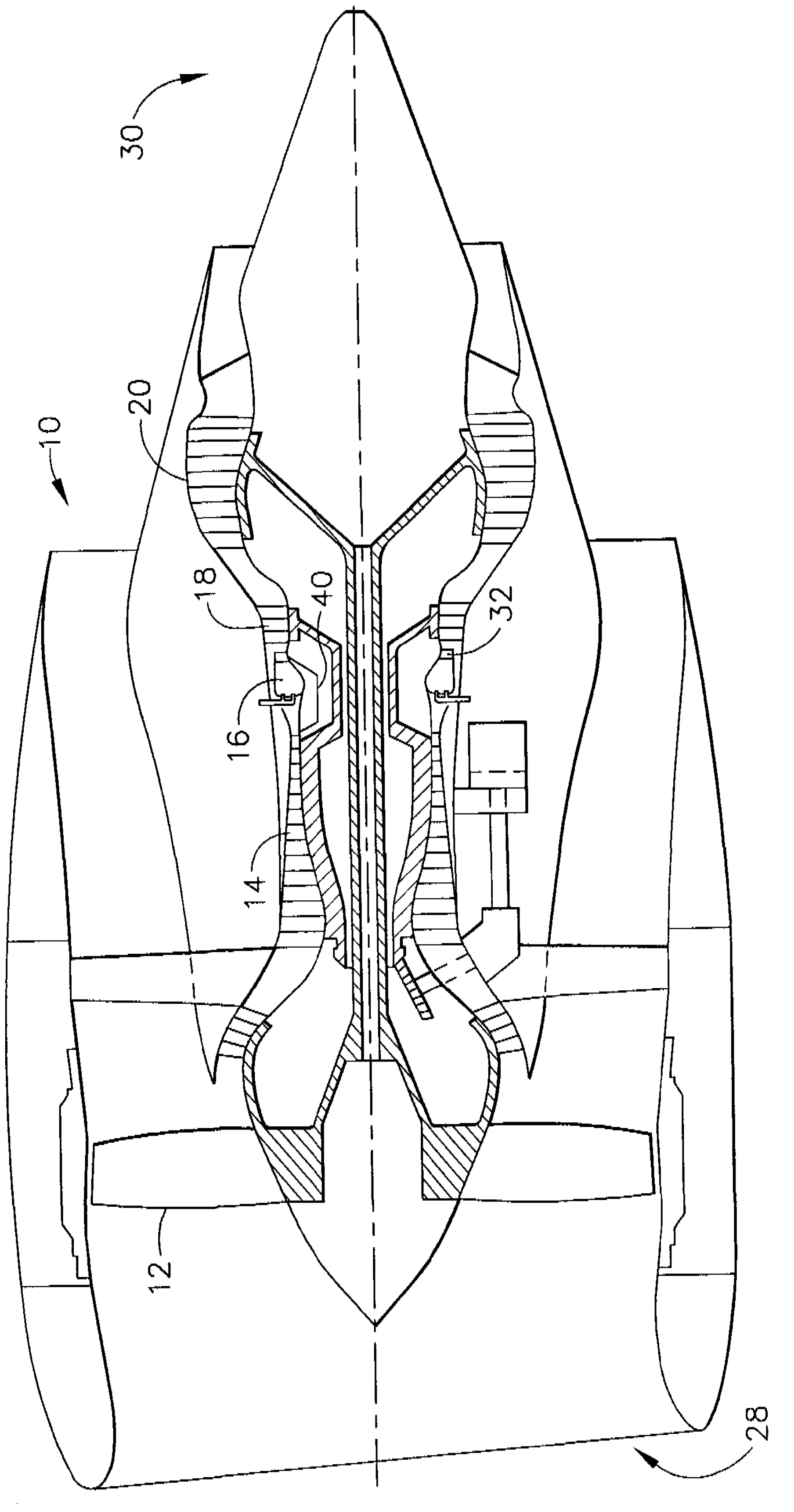
FIG. 1 is a schematic illustration of an exemplary gas turbine engine.

FIG. 1 is a schematic illustration of a gas turbine engine 10 including, in serial flow arrangement, a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a TFE-731 engine commercially available from Honeywell Aerospace, Phoenix, Ariz.

In operation, air flows through fan assembly 12 and compressed air is supplied to high-pressure compressor 14. The highly compressed air is delivered to combustor 16. Airflow from combustor 16 is directed to drive turbines 18 and 20, and turbine 20 drives fan assembly 12. Turbine 18 drives high-pressure compressor 14.

Figure 2:
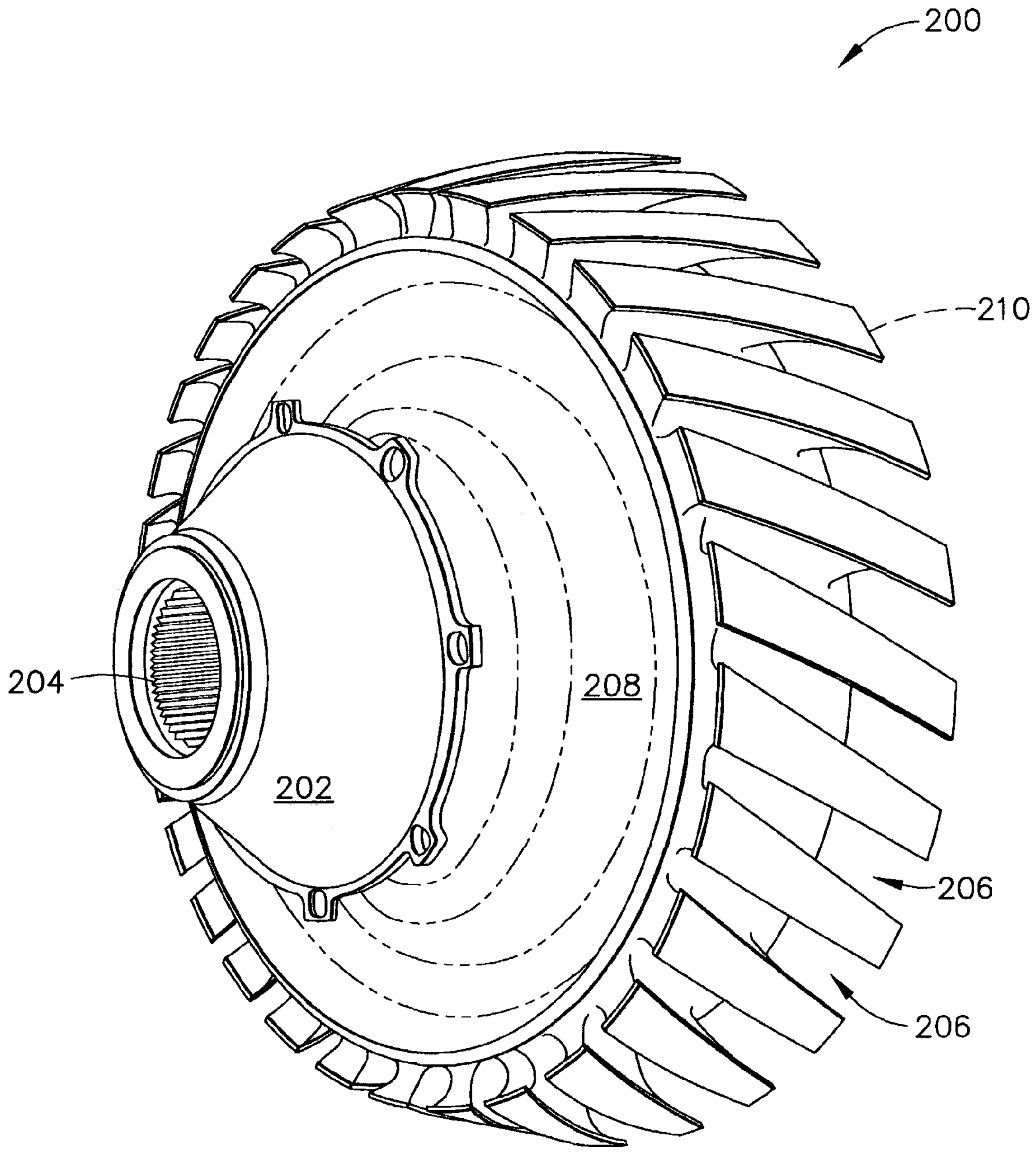
FIG. 2 is a perspective view of an exemplary gas turbine fan disc that may be used with a gas turbine engine, such as the turbine shown in FIG. 1.

FIG. 2 is a perspective view of an exemplary gas turbine fan disc 200 that may be used with a gas turbine engine, such as turbine 10 (shown in FIG. 1). Disc 200 includes a hub 202 that includes a shaft opening 204 extending therethrough. Disc 200 also includes a plurality of circumferentially-spaced dovetail slots 206 that extend from a leading face 208 to a trailing face 210 of disc 200.

In operation, shaft opening 204 is coupled to a shaft (not shown) of engine 10 such that disc 200 is driven through the shaft by compressor 20.

Figure 3:
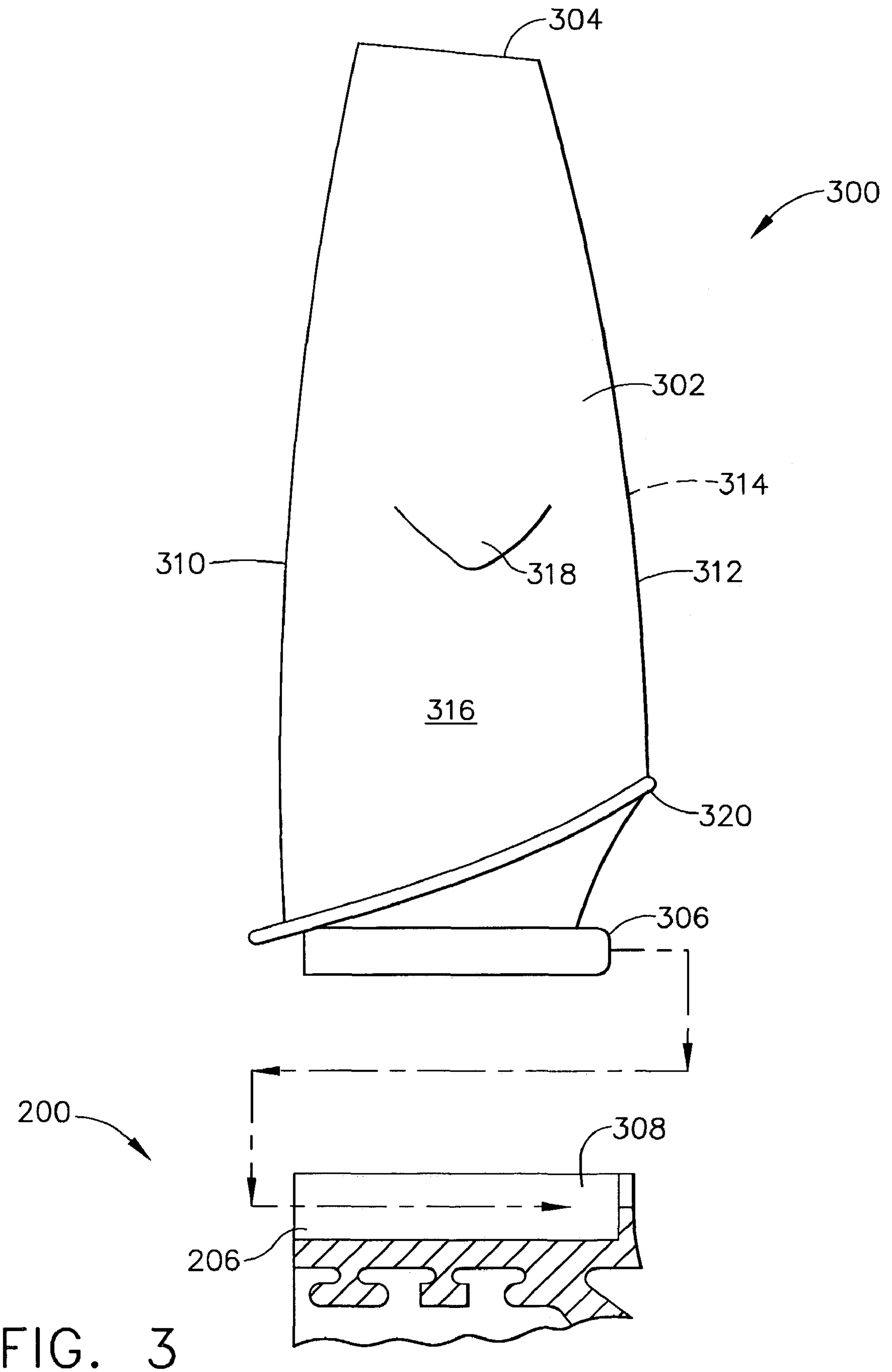
FIG. 3 is a schematic side view of an exemplary rotor fan blade that may be used with the fan assembly shown in FIG. 1.

FIG. 3 is an exploded schematic side view of an exemplary rotor fan blade 300 that may be used with fan assembly 12 (shown in FIG. 1). When fully assembled, fan assembly 12 includes a plurality of blades 300 coupled to disc 200. Blade 300 includes an airfoil 302 that extends between a blade tip 304 and a blade dovetail 306 that is configured to engage one of the plurality of dovetail slots 206 of disc 200. In the exemplary embodiment, an adapter 308 may be used to facilitate mating of dovetail 306 and slot 206. Airfoil 302 includes a leading edge 310, a trailing edge 312, and a pressure side 314 and a suction side 316 that each extends between leading edge 310 and trailing edge 312. Suction side 316 includes a first mid-span damper 318 that extends outwardly from suction side 316 and is configured to interlock with a high-pressure side mid-span damper (not shown) coupled to a first adjacent fan rotor blade (not shown). Pressure side 314 includes a second mid-span damper (not shown) that extends outwardly from pressure side 314 and is configured to interlock with a suction-side mid-span damper (not shown) coupled to a second adjacent fan rotor blade (not shown). Each of pressure side 314 and suction side 316 include a platform 320 that extends from leading edge 310 and trailing edge 312 proximate dovetail 306.

During installation, adapter 308 is inserted into slot 206 and dovetail 306 is slid into slot 206 sufficiently to hold adapter 308 in place. An adjacent blade is inserted into a slot adjacent to slot 206 in a similar manner. Each of the plurality of blades is inserted into a predetermined respective slot until all of the plurality of fan rotor blades are inserted into a respective slot just sufficiently to hold respective adapters 308 in place.

Figure 4:
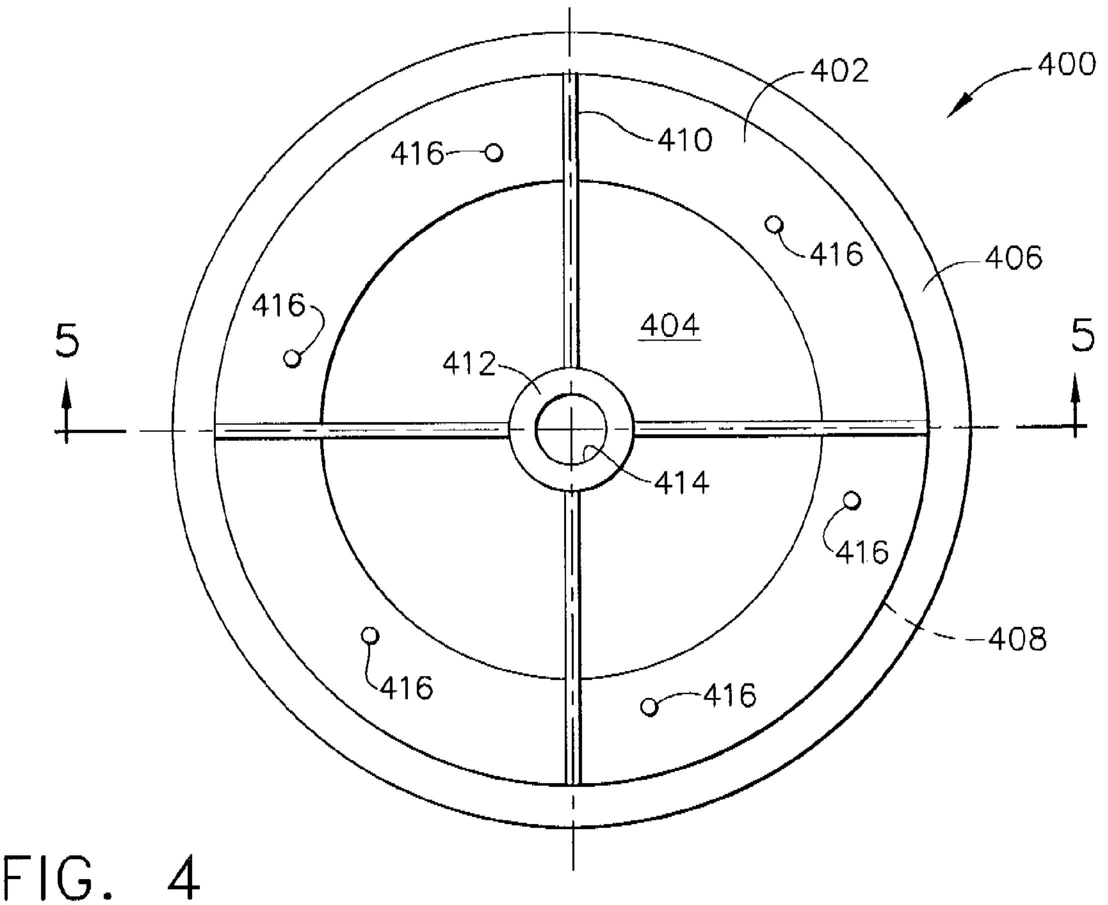
FIG. 4 is a plan view of an exemplary blade installation tool that may be used to facilitate installing a plurality of rotor blades shown in FIG. 3.
Figure 5:
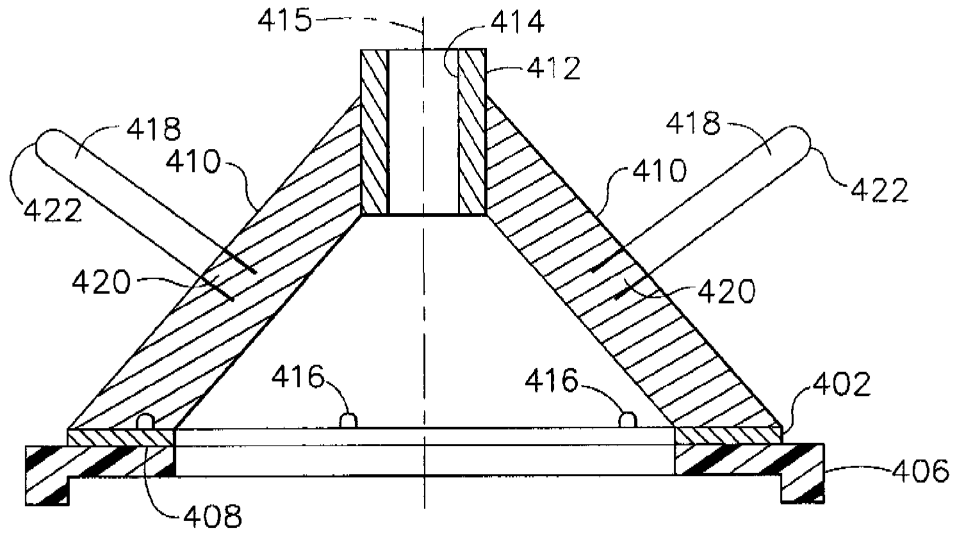
FIG. 5 is a side elevation view of the blade installation tool shown in FIG. 4 taken along line 4-4, also shown in FIG. 4.

FIG. 4 is a plan view of an exemplary blade installation tool 400 that may be used to facilitate installing a plurality of rotor blades 300 (shown in FIG. 3). FIG. 5 is a side elevation view of tool 400 taken along line 4-4 (shown in FIG. 4). Tool 400 includes a blade engagement end 402 that includes a central opening 404. In the exemplary embodiment, end 402 includes a circularly-shaped body having a circularly-shaped opening therethrough. In alternative embodiments, other shaped bodies are contemplated such that engagement end 402 is configured to fulfill the requirements discussed below. Engagement end 402 also includes a pad 406 coupled to an engagement face 408 of engagement end 402. In the exemplary embodiment, pad 406 is fabricated from a material that is softer than a material from which blade 300 is fabricated from. Pad 406 facilitates protecting blade 300 during an installation process. Additionally, pad 406 transmits an installation force from engagement face 408 to blades 300 during the installation process. Tool 400 includes at least one brace 410 coupled to engagement end 402 to support a guide end 412. Guide end 412 includes a guide opening 414 therethrough. In the exemplary embodiment, a first end of brace 410 is welded to engagement end 402 such that brace 410 does not interfere with pad 406 and/or any of the plurality of blades 300 during the installation process. A second end of brace 410 is coupled to guide end 412 such that during the installation process engagement end 402 and guide end 412 are substantially co-axially aligned with longitudinal axis 415. In the exemplary embodiment, four braces 410 are welded to engagement end 402 and guide end 412. In an alternative embodiment, at least one brace 410 is hingedly coupled to engagement end 402 and guide end 412 such that during non-use engagement end 402 and guide end 412 may not be substantially co-axially aligned. In the exemplary embodiment, engagement end 402 includes a plurality of fastener holes for coupling pad 406 to engagement end 402 using fasteners 416 such as, but not limited to, rivets, nuts and bolts, and pins. In alternative embodiments, pad 406 may be coupled to engagement end 402 using non-fasteners, such as, but not limited to, adhesive, friction fit, and interference fit. In the exemplary embodiment, tool 400 includes at least one handle 418 coupled to brace 410 to facilitate applying manual force to tool 400. Handle 418 includes a first end 420 coupled to brace 410 and a second opposite end 422 that may be configured for ergonomic manual grasping. Handle 418 may couple to brace 410 perpendicularly. Alternatively, handle 418 may be coupled to brace 410 at an angle that is predetermined to facilitate grasping and applying a force to tool 400.

Figure 6:
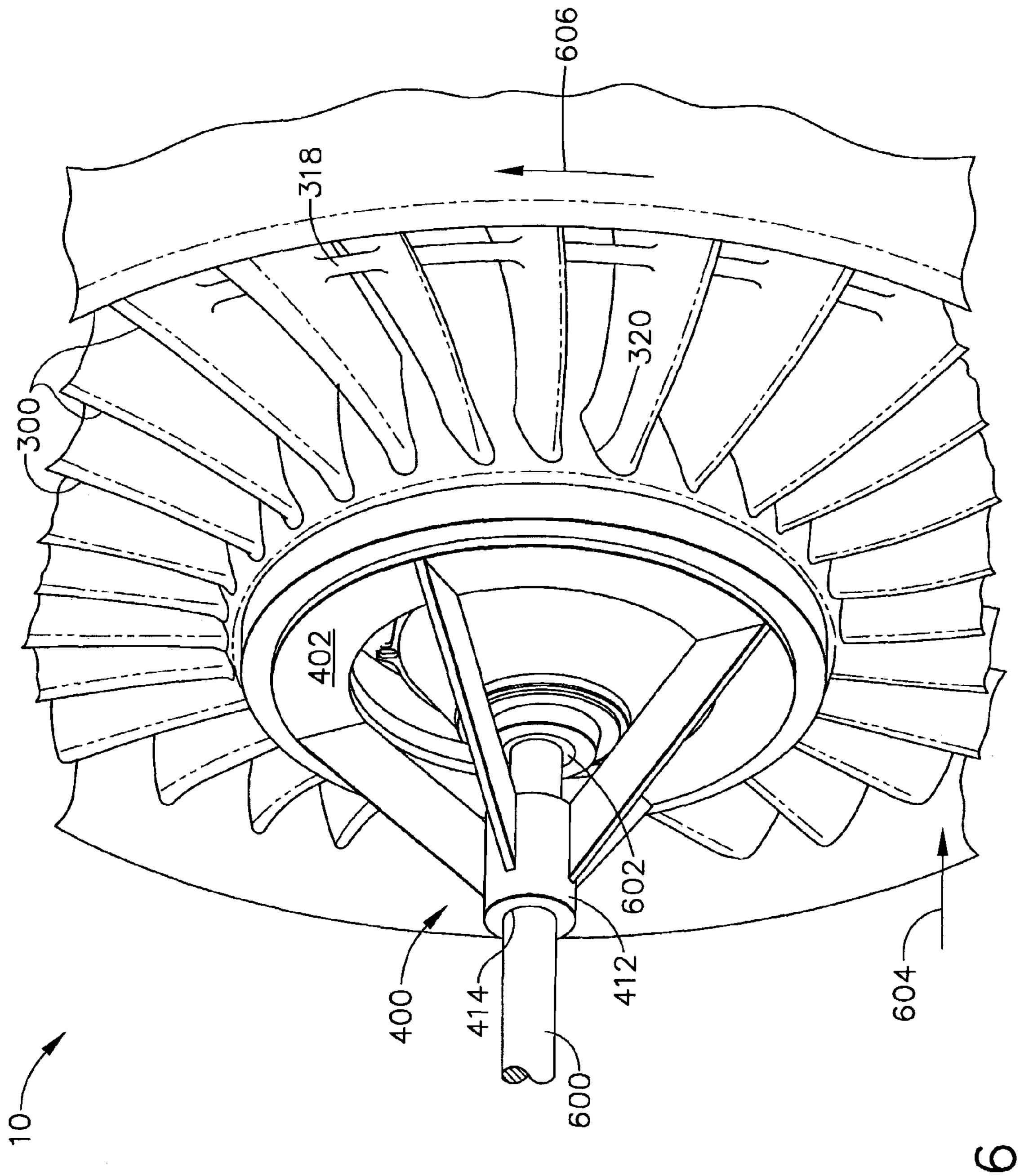
FIG. 6 is a perspective view of the blade insertion tool coupled to a gas turbine engine, such as the engine shown in FIG. 1.

FIG. 6 is a perspective view of blade insertion tool 400 coupled to a gas turbine engine, such as engine 10 (shown in FIG. 1). During installation in disc 200, blades 300 are inserted partially into slots 206 as described above. A guide shaft 600 is inserted into a opening in the end of engine shaft 602. Installation tool is installed onto shaft 600, threading tool 400 over shaft 600, engagement end first such that shaft 600 passes through opening 414. Tool 400 is slid towards blades 300 until pad 406, if installed, contacts blades 300. In the exemplary embodiment, engagement end 402 is configured to engage each blade 300 proximate platform 320. In an alternative embodiment, engagement end 402 is configured to engage each blade 300 between mid-span damper 318 and dovetail 306. With tool 400 in contact with blades 300, a manual axial pressure is applied evenly to tool 400 in direction 604 while a manual torque is also applied to tool 400 in direction 606. Blades 300 slide axially in direction 604 to seat fully in slots 206. During installation, mid-span dampers 318 interlock with each adjacent mid-span damper. Tool 400 transfers the manual axial pressure from an operator to a substantially simultaneous axial motive force on each blade 300 facilitating preventing interlocking mid-span dampers 318 from stacking-up during the installation process.

The above-described blade installation tool is cost-effective and highly reliable for installing fan blades onto a fan rotor such that the blades are seated substantially simultaneously and without mid-span damper overlap. More specifically, the methods and systems described herein facilitate applying a motive force to all blades substantially simultaneously to seat the blades in their respective slots. In addition, the above-described methods and systems facilitate providing a faster and more reliable installation method. As a result, the methods and systems described herein facilitate reducing labor necessary to install fan rotor blades on a fan rotor disc in a cost-effective and reliable manner.

While the invention has been described in terms of various specific embodiments, those skilled in the art will recognize that the invention can be practiced with modification within the spirit and scope of the claims.

What is claimed is:

1. A rotor blade installation tool for coupling a plurality of rotor blades to a rotor disc wherein each rotor blade extends from the rotor disc to a radially outer blade tip, said tool comprising:

a blade engagement end configured to engage the plurality of rotor blades between the rotor disc and the radially outer blade tip, said blade engagement end comprising an engagement top surface;

at least one brace coupled to said blade engagement end at a first end of said at least one brace;

at least one handle coupled to said at least one brace at a predetermined angle to facilitate inducing an axial force to the plurality of rotor blades; and a guide end coupled to a second end of said at least one brace, said guide end comprising a guide end top surface positioned above said engagement top surface and a guide end opening extending therethrough, said at least one handle extending from said at least one brace between said brace first end and said brace second end.

2. A tool in accordance with claim 1 wherein each of the plurality of rotor blades being coupled to the rotor disc using said tool extends radially between a dovetail and a mid-span damper, said blade engagement end comprises an engagement face configured to contact each of the plurality of blades between the dovetails and the mid-span dampers during a blade installation process.

3. A tool in accordance with claim 2 wherein said engagement face comprises a pad coupled to said engagement face.

4. A tool in accordance with claim 3 wherein said plurality of blades are fabricated from a material having a first hardness number, said pad is fabricated from a material having a second hardness number, said first hardness number is greater than said second hardness number.

5. A tool in accordance with claim 1 wherein said blade engagement end further comprises a central opening therethrough, said tool configured to receive a guide shaft therethrough from said central opening through said guide end opening.

6. A tool in accordance with claim 5 wherein said guide end is configured to slidingly couple to the guide shaft.

7. A tool in accordance with claim 1 wherein said blade engagement end comprises a circular cross-section.

8. A tool in accordance with claim 1 wherein said blade engagement end comprises a first riffled engagement side configured to conform with at least one said plurality of rotor blades.

9. A tool in accordance with claim 1 wherein said at least one brace is configured to maintain said engagement end and said guide end in alignment during a blade installation process.

10. A tool in accordance with claim 1 wherein said at least one handle is configured to assist a manual rotation of said tool during an installation process.

* * * * *